(12) United States Patent
Desruisseaux (10) Patent No.: US 8,223,169 B2
(45) Date of Patent: Jul. 17, 2012

(54) STABILIZING IMAGES

(75) Inventor: Eric Desruisseaux, Montreal (CA)

(73) Assignee: Autodesk, Inc., San Rafael, CA (US)

( * ) Notice: Subject to any disclaimer, the term of this patent is extended or adjusted under 35 U.S.C. 154(b) by 827 days.

(21) Appl. No.: 12/370,274

(22) Filed: Feb. 12, 2009

(65) Prior Publication Data
US 2010/0201710 A1 Aug. 12, 2010

(51) Int. Cl.
*G09G 5/14* (2006.01)
(52) U.S. Cl. ......... 345/619; 345/620; 345/629; 345/610
(58) Field of Classification Search .................. 345/629, 345/610, 620, 619
See application file for complete search history.

(56) References Cited

OTHER PUBLICATIONS

Wikipedia: "3D projection". http://en.wikipedia.org/wiki/3D_projection; 3 pages; Dec. 13, 2008.
Wikipedia: "Transformation matrix". http://en.wikipedia.org/wiki/Transformation_matrix; 6 pages; Jan. 12, 2009.

*Primary Examiner* — Javid A Amini
(74) *Attorney, Agent, or Firm* — Gates & Cooper LLP (57) ABSTRACT

A method, apparatus, and computer readable storage medium provides the ability to stabilize a series of two or more still images (i.e., a clip). The clip of image data is obtained. The clip is then analyzed to produce a set of source curves that represent a global movement detected in the clip. Each of the source curves is filtered to compute result curves. The source and result curves are then exposed and displayed to the user who may modify/tweak the curves as desired. Automatically, without additional user input, and without reanalyzing the original clip, the result curves are recomputed based on the user's changes. The original clip is then transformed into a result clip/series based on the source and result curves.

21 Claims, 5 Drawing Sheets

STABILIZING IMAGES

BACKGROUND OF THE INVENTION

1. Field of the Invention

The present invention relates generally to stabilizing images in a film clip, and in particular, to a method, apparatus, and article of manufacture for stabilizing images by exposing and using source curves representing global movement detected in a film clip.

2. Description of the Related Art

In a high-end post-production system, stabilization is an important part of the processing pipeline. Even with today's greatest tracking algorithms, automatic stabilization of some film shots is sometimes impossible. There are many causes to this problem including:

excessive/random shaking in the original shot;
occlusion;
movement/distortion of certain elements in the shot; and
general lack of flexibility in the tracking algorithm.

Typically, each cause leads to a bad result, which means that the result shots will not be 100% stabilized.

In the prior art, to stabilize a sequence of images, the entire sequence of images is analyzed to produce a set of "trackers" that follow entities throughout the sequence. Once analyzed, the user has the option of accepting the analysis and trackers or the user could re-perform the analysis by specifying either a region-of-interest (ROI) or a matte (mask) that would try to isolate the feature that must be tracked. However, whether an ROI or matte is provided, the entire analysis of the sequence of images must be re-performed which consumes a considerable amount of time and processing. In addition, since the features might move within a scene (e.g., throughout the sequence of images), the ROI/mask must be animated prior to the analysis for the analysis to result in a satisfactory result. Such a methodology may still fail to solve the stabilization process, consumes considerable time and resources, and may further present additional problems.

Accordingly, what is needed is a methodology that allows the user to stabilize a sequence of images by modifying/adjusting the results of an analysis of images in a clip without re-analyzing the original images.

SUMMARY OF THE INVENTION

One or more embodiments of the invention overcome the problems of the prior art providing the ability to fully expose and modify/tweak analysis/stabilization curves in order to manipulate relative camera shake. Such capabilities are provided without performing a second or re-analysis of image data thereby speeding up the process and reducing the amount of user interaction necessary.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Overview

A clip of image data is analyzed to produce a set of source stabilization curves. The source stabilization curves are exposed to the user who may modify and edit the curves as desired. Thereafter, without reanalyzing the original clip of image data, result curves are determined that are directly applied to the clip of image data to stabilize any global movement in the clip.

Hardware Environment

Figure 1:
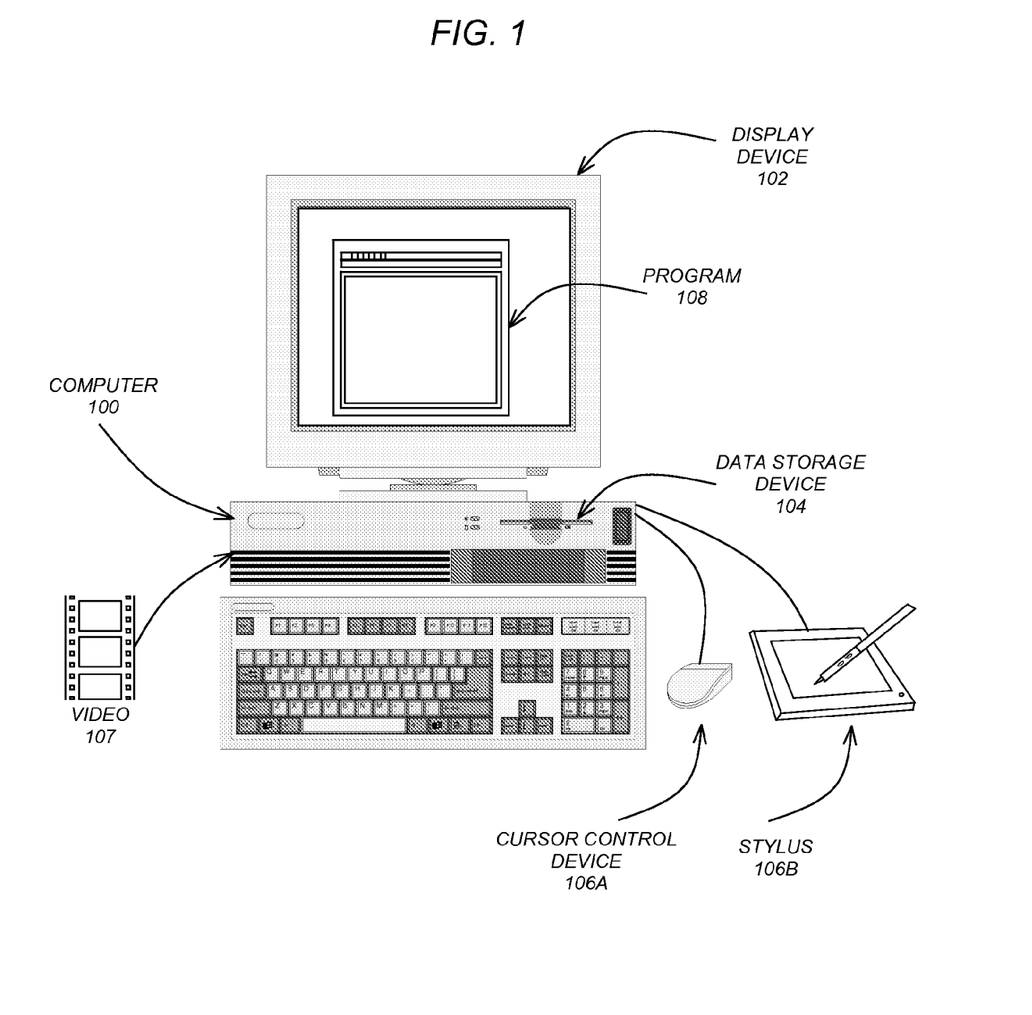
FIG. 1 is an exemplary hardware and software environment used to implement one or more embodiments of the invention.

FIG. 1 is an exemplary hardware and software environment used to implement one or more embodiments of the invention. Embodiments of the invention are typically implemented using a computer 100, which generally includes or are communicatively coupled to a display device 102, data storage device(s) 104, cursor control devices 106A, stylus 106B, and other devices. In addition, a clip of image data such as a camera shot or video 107 may be used an input into computer 100. Those skilled in the art will recognize that any combination of the above components, or any number of different components, peripherals, and other devices, may be used with the computer 100.

One or more embodiments of the invention are implemented by a computer-implemented program 108 (or multiple programs 108). Such a program may be a visual effects design and/or compositing application, a video editing (linear or non-linear) application, an animation application, color-grading and color management application, a compiler, a parser, a shader, a shader manager library, a Graphics Processing Unit (GPU) program, or any type of program that executes on a computer 100 (e.g., that performs edits on or manipulates video 107). The program 108 may be represented by one or more windows displayed on the display device 102. Generally, the program 108 comprises logic and/or data embodied in/or readable from a device, media, carrier, or signal, e.g., one or more fixed and/or removable data storage devices 104 connected directly or indirectly to the computer 100, one or more remote devices coupled to the computer 100 via a data communications device, etc. In addition, program 108 (or other programs described herein) may be an object-oriented program having objects and methods as understood in the art. Further, the program 108 may be written in any programming language including C, C++, Pascal, Fortran, Java™, etc. Further, as used herein, multiple different programs may be used and communicate with each other.

In one or more embodiments, instructions implementing the graphics program 108 are tangibly embodied in a computer-readable medium, e.g., data storage device 104, which could include one or more fixed or removable data storage devices, such as a zip drive, floppy disc drive, hard drive, CD-ROM drive, DVD drive, tape drive, etc. Further, the graphics program 108 is comprised of instructions which, when read and executed by the computer 100, causes the computer 100 to perform the steps necessary to implement and/or use the present invention. Graphics program 108 and/or operating instructions may also be tangibly embodied in a memory and/or data communications devices of computer 100, thereby making a computer program product or article of manufacture according to the invention. As such, the terms "article of manufacture" and "computer program product" as used herein are intended to encompass a computer program accessible from any computer readable device or media. Further, as used herein, embodiments may also include a computer readable storage medium encoded with computer program instructions which when accessed by a computer cause the computer to load the program instructions to a memory therein creating a special purpose data structure causing the computer to operate as a specially programmed computer that executes a method.

Figure 2:
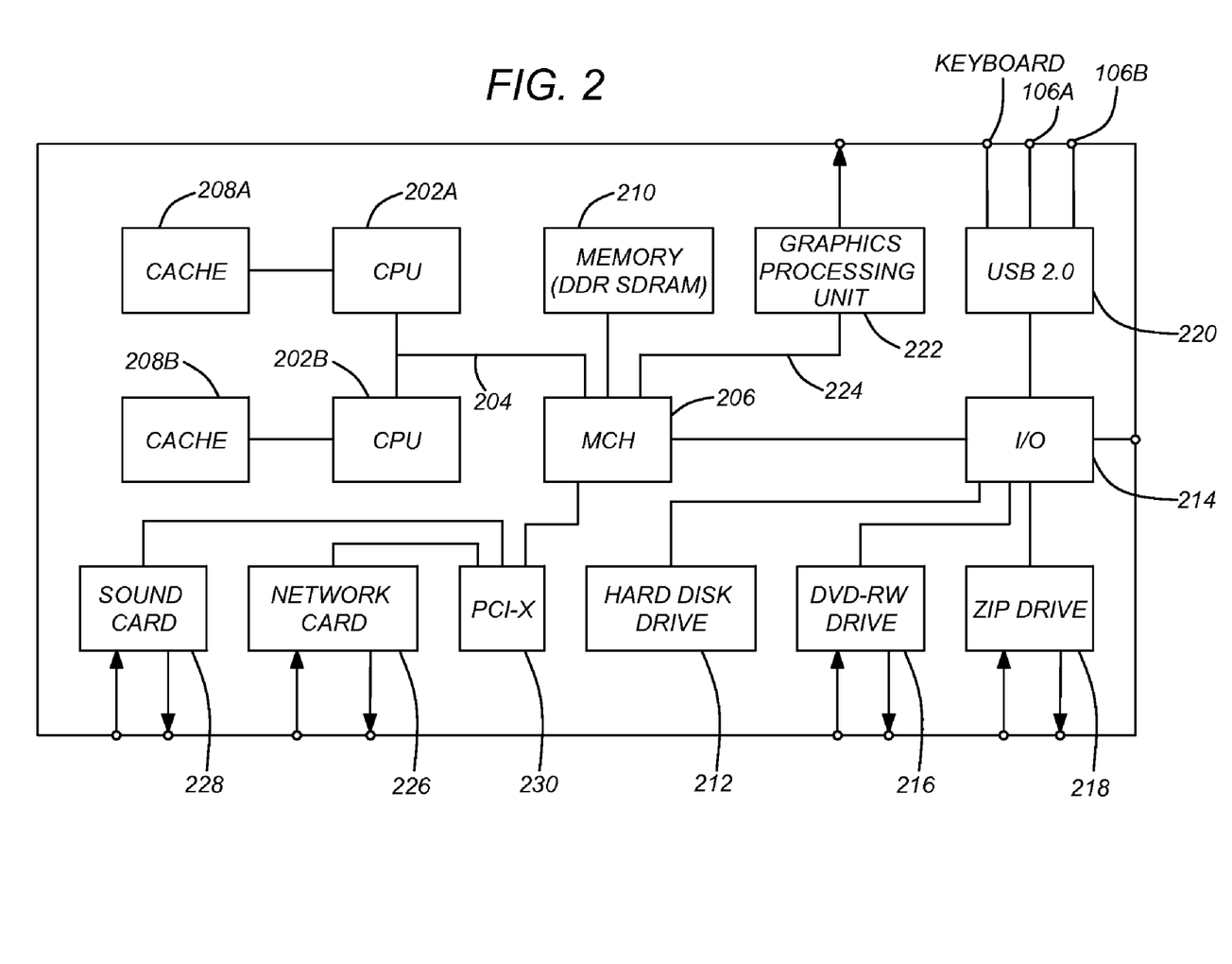
FIG. 2 illustrates the components of a computer system in accordance with one or more embodiments of the invention.

The components of computer system 100 are further detailed in FIG. 2 and, in one or more embodiments of the present invention, said components may be based upon the Intel® E7505 hub-based chipset.

The system 100 includes two central processing units (CPUs) 202A, 202B (e.g., Intel® Pentium™ Xeon™ 4 DP CPUs running at three Gigahertz, or AMD™ CPUs such as the Opteron™/Athlon X2™/Athlon™ 64), that fetch and execute instructions and manipulate data via a system bus 204 providing connectivity with a Memory Controller Hub (MCH) 206. CPUs 202A, 202B are configured with respective high-speed caches 208A, 208B (e.g., that may comprise at least five hundred and twelve kilobytes), which store frequently accessed instructions and data to reduce fetching operations from a larger memory 210 via MCH 206. The MCH 206 thus co-ordinates data flow with a larger, dual-channel double-data rate main memory 210 (e.g., that is between two and four gigabytes in data storage capacity) and stores executable programs which, along with data, are received via said bus 204 from a hard disk drive 212 providing non-volatile bulk storage of instructions and data via an Input/Output Controller Hub (ICH) 214. The I/O hub 214 similarly provides connectivity to DVD-ROM read-writer 216 and ZIP™ drive 218, both of which read and write data and instructions from and to removable data storage media. Finally, I/O hub 214 provides connectivity to USB 2.0 input/output sockets 220, to which the stylus and tablet 106B combination, keyboard, mouse 106A, and video 107 are connected, all of which send user input data to system 100.

A graphics card (also referred to as a graphics processing unit [GPU]) 222 receives graphics data (e.g., originally recorded by video 107) from CPUs 202A, 202B along with graphics instructions via MCH 206. The GPU 222 may be coupled to the MCH 206 through a direct port 224, such as the direct-attached advanced graphics port 8X (AGP™ 8X) promulgated by the Intel® Corporation, or the PCI-Express™ (PCIe) x16, the bandwidth of which may exceed the bandwidth of bus 204. The GPU 222 may also include substantial dedicated graphical processing capabilities, so that the CPUs 202A, 202B are not burdened with computationally intensive tasks for which they are not optimized.

GPU 222 (also referred to as video processing units [VPUs], graphics cards, or video cards) can be programmed in order to customize their functionality. GPU 222 programming is a very powerful and versatile technology because it allows software developers to implement complex imaging and data processing algorithms and execute the algorithms at high speeds on a computer workstation's GPU 222. Accordingly, a GPU 222 is a specialized logic chip or card that is devoted to rendering 2D or 3D images (e.g., video 107). Display adapters often contain one or more GPUs 222 for fast graphics rendering. The more sophisticated and faster the GPUs 222, combined with the architecture of the display adapter, the more realistically games and video are displayed. GPUs 222 may each have particular video/display capabilities for use in different environments. For example, GPU 222 may provide capabilities for texturing, shading, filtering, blending, rendering, interlacing/de-interlacing, scaling, multiple GPU 222 parallel execution, color correction, encoding, TV output, etc.

Network card 226 provides connectivity to another computer 100 or other device (e.g., a framestore, storage, etc.) by processing a plurality of communication protocols, for instance a communication protocol suitable to encode and send and/or receive and decode packets of data over a Gigabit-Ethernet local area network. A sound card 228 is provided which receives sound data from the CPUs 202A, 202B along with sound processing instructions, in a manner similar to GPU 222. The sound card 228 may also include substantial dedicated digital sound processing capabilities, so that the CPUs 202A, 202B are not burdened with computationally intensive tasks for which they are not optimized. Network card 226 and sound card 228 may exchange data with CPUs 202A, 202B over system bus 204 by means of a controller hub 230 (e.g., Intel®'s PCI-X controller hub) administered by MCH 206.

Those skilled in the art will recognize that the exemplary environment illustrated in FIGS. 1 and 2 are not intended to limit the present invention. Indeed, those skilled in the art will recognize that other alternative environments may be used without departing from the scope of the present invention.

Software Embodiments

One or more embodiments of the invention provide for a graphics application 108 that enables the ability to stabilize or edit global movements from an original film shot (e.g., caused by camera shaking during filming) 107. To better understand the context of the invention, a description of image processing and clips is useful.

As used herein, a clip is a sequence of images or frames 107 loaded from an external device such as a VTR (video tape recorder), stored in digital format, and displayed in a clip library and on a desktop. Clips may be edited, processed, and recorded to/on external devices. Postproduction of sequences for film and video is an extremely complex undertaking. Each clip may have dozens of separate elements/operations that need to be combined/composited, each individual element requiring significant effort on the part of a digital artist. For example, to composite a moving car onto a new background may require a mask for the car be cut and perfected for every frame of the sequence.

Professional compositing software helps digital artists and managers visualize the process of clip development by building a "dependency graph" of elements and effects for each sequence. In such software, operators, tasks, or modules/functions perform a variety of functions with respect to a clip or source. For example, a module may perform compositing, painting, color correction, degraining, blurring, etc. A dependency graph of such software may also be referred to as a process tree or a schematic view of a process tree. Such a tree illustrates the elements and effects needed to complete a sequence of functions and identifies the hierarchy that shows the relationship and dependencies between elements. Accordingly, as the end-user interacts with media and tools in a schematic view, the system constructs a graph representing the activity and the relationships between the media and tools invoked upon them. The purpose of the dependency graph is to manage and maintain the relationships between the nodes representing the media and the tools.

To remove camera jitter or lock an object's position over a sequence of frames (in a video 107) to make it appear motionless, one or more embodiments may provide a stabilization node for use by the user. The stabilization node employs a tracking engine that analyzes a clip of image data (consisting of multiple frames) to detect movement. In this regard, certain features of an image are identified on a per frame basis and camera movement is determined from one frame to another frame. Users may identify a matte/mask to exclude certain areas from the analysis (which may require an animated matte over time) or alternatively may specify a region of interest that provides a rectangle (or other geometric shape) that the user can resize to indicate the region to be analyzed in the clip (which may also be animated over time).

In the prior art, subsequent to the analysis, the user was shown what was tracked in a scene (e.g., via a series of trackers/track points). Thereafter, the user could remove or add to a particular feature. However, after editing the trackers, the prior art required the analysis of the entire scene to be re-performed. Further, such a methodology would not permit the ability to edit or work with perspective.

In one or more embodiments of the invention, the output of the tracking engine is a set of curves that represents the global movement detected in the original shot (animation or series of still images) 107. Those curves are referred to herein as the "source curves". There is one source curve for each of the following nine (9) axis:
 Position (X/Y);
 Scaling (X/Y);
 Rotation (Z);
 Perspective (X/Y/Shear/Anamorphic).

To create a source curve, the tracking engine produces "transform-matrices" (one 4×4 matrix for each frame). Each of the matrices may be in a standard openGL format and represents the detected transformation between the first frame and the current frame (i.e., the camera movement/jitter for the frame that has just been analyzed). Such transformation matrices are created using 3D projections (e.g., orthographic or perspective projections) obtained by tracking features of the images using trackers.

It is undesirable and difficult for a user to work directly with such matrices. Accordingly, using basic matrix operations, parameters are extracted from the matrix (position, rotation, scaling, etc.) and a value is set on a curve for each of those parameters. By producing the matrix and extracting parameters for each frame over the clip (i.e., over many frames), the source curves result. In other words, based on the matrix and extraction, a source curve results on each parameter that is animated over time. Thus, each curve represents the raw movement that is detected for the particular parameter.

Based on user defined parameters, each of these source curves is then filtered (in the frequency domain) to obtain "result curves" (smooth version of the "source curves"). The difference between the "result curves" and the "source curves" defines the applied transformation that can be used to stabilize the source shot, removing the detected movement and producing the result shot.

Various methods may be used to filter the source curves. For example, a camera pan may have shaking in the same axis. A high frequency filter could be used to potentially eliminate the shake but retain the pan movement. Various blur operations (e.g., an average blur or median blur) can be used to filter the high frequency data. In addition, the blur operation may be flexible by exposing allowing modification of parameters of the blur operation by the user (e.g., radius, weight of center pixel, etc.).

Once the filtering (e.g., blur operation) is completed, the output is a set of "result curves". However, rather than forcing a reanalysis of the original shot or image data to obtain the source and result curves, the source curves are exposed to the user who may edit the curves as desired (e.g., using a curve/channel editor). Subsequent to the editing, the result curves are re-calculated. The parameters and values are extracted from the result curves (using standard matrix functions) to provide a transformation matrix that can be applied to each frame to remove the undesirable movement (e.g., camera jitter or shaking).

Figure 3:
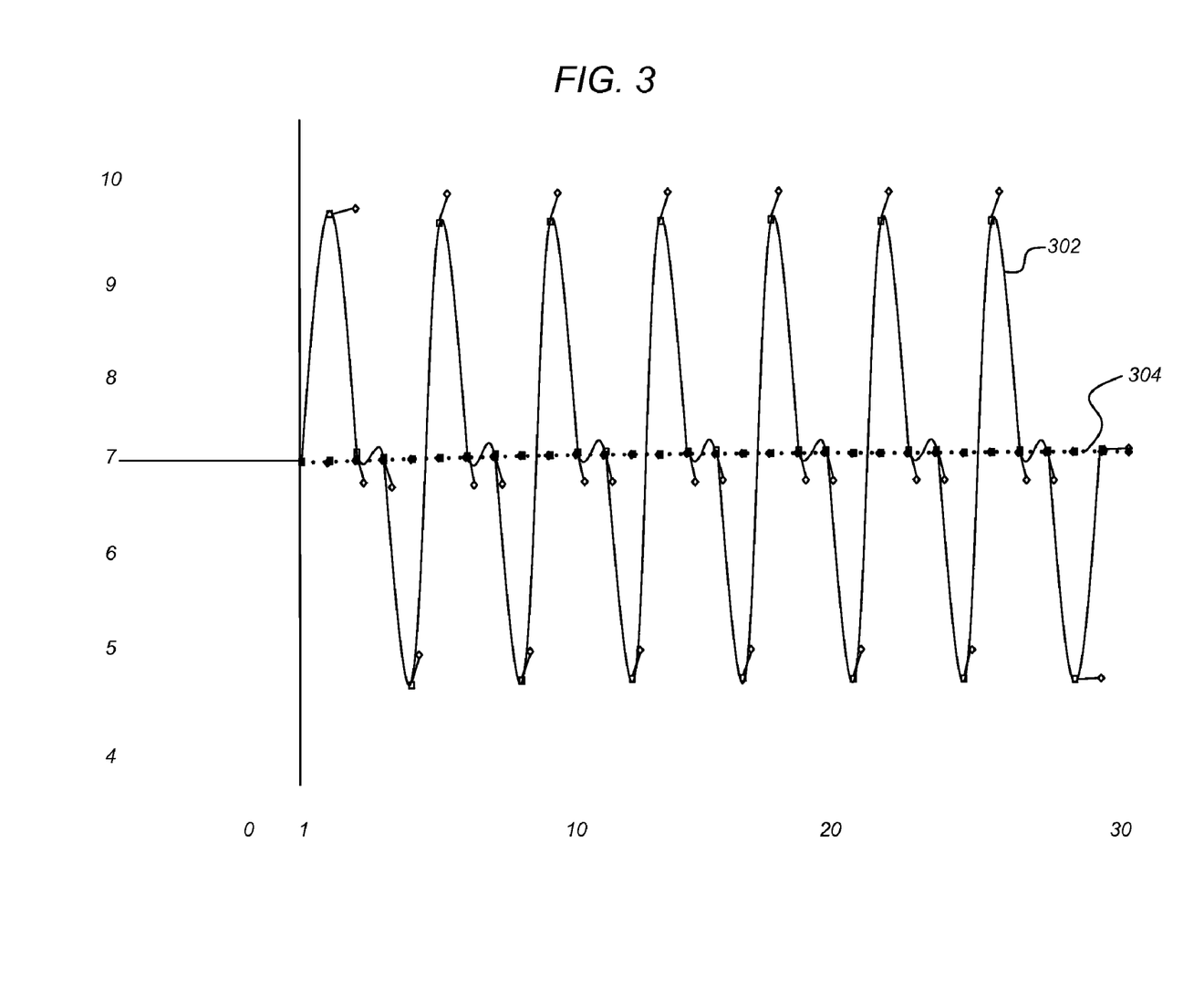
FIGS. 3 and 4 illustrate a source curve and result curve in accordance with one or more embodiments of the invention.
Figure 4:
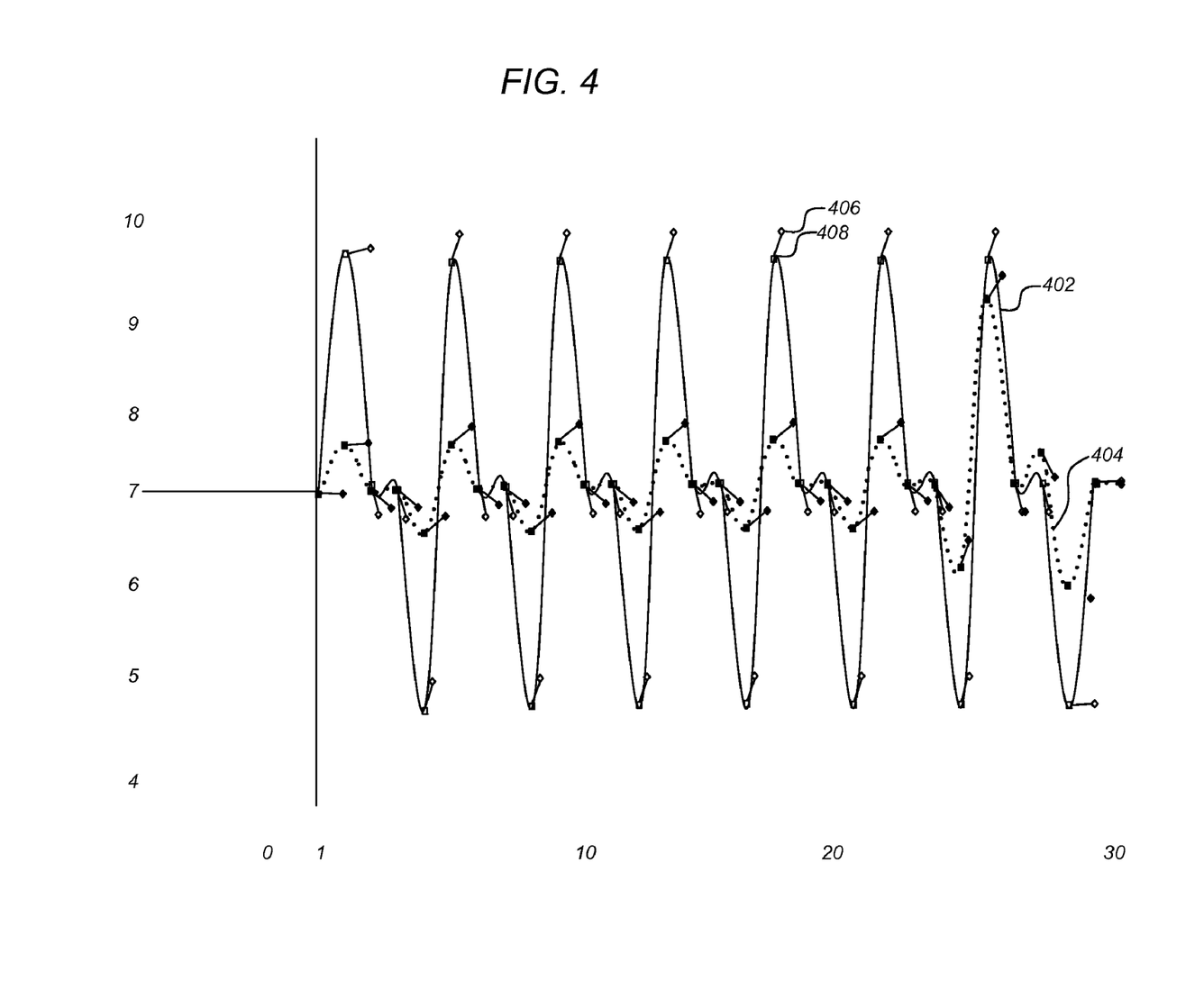

FIGS. 3 and 4 illustrate a source curve and result curve in accordance with one or more embodiments of the invention. Curves 302 and 402 are the source curves and curves 304 and 404 are the filtered result curves. The curves 302, 402, 304, and 404 are the result of an analysis on a fifty (50)-frame shot with camera shake. As illustrated in FIG. 3, based on the parameters specified, the result curve 304 is completely filtered and the camera movement is completely removed (i.e., the result curve appears fairly straight/smooth).

In FIG. 4, the filtering parameters were changed so that the camera shake is reduced, but not completely removed. In such a case, embodiments of the invention allow the user to pick any point (e.g., point 406-408) in the source curve 402 and modify the point 406-408.

As described above, if the user were to modify the trackers, specify a region of interest, or utilize a matte, the source curves 302 and 402 would contain various glitches and offsets. Accordingly, regardless of the filtering performed, acceptable result curve 304 and 404 could not produced. Accordingly, embodiments of the invention allow the user to use his/her judgment (and knowledge of the shot movement) to modify the "source curves" 302 and 402 so that they represent the real movement in the original shots. This curve modification/tweaking can be performed using available curve editing modules. For example, in one or more embodiments, the channel editor, a powerful and flexible curve editor tool that is accessible in the IFF/FS software suite offered by the assignee of the present invention may be used to edit the source curves 302/402.

By editing the source curves 302/402, the "result curves" 304 and 404 are automatically recomputed and the result is automatically regenerated. As used herein, the term "automatically" refers to performing steps without additional user input and/or independently from other steps (e.g., independent from the analysis of the original image data 107).

Once the source curves 302 and 402 have been manipulated and the user is satisfied with the results (i.e., the result curves 304 and 404), the resulting image can be computed. In this regard, the applied transformation (for a specific frame) is the difference between the source curves 302/402 and result curves 304/404. Those differences (one for position, one for scaling, etc.) are used to compute a transformation matrix. This matrix transformation is used in openGL (the graphic library) and the source image (i.e., original shot 107) is transformed according to this transformation, bringing the tracked feature at the same position as it was on the reference frame (typically the first frame).

Logical Flow

Figure 5:
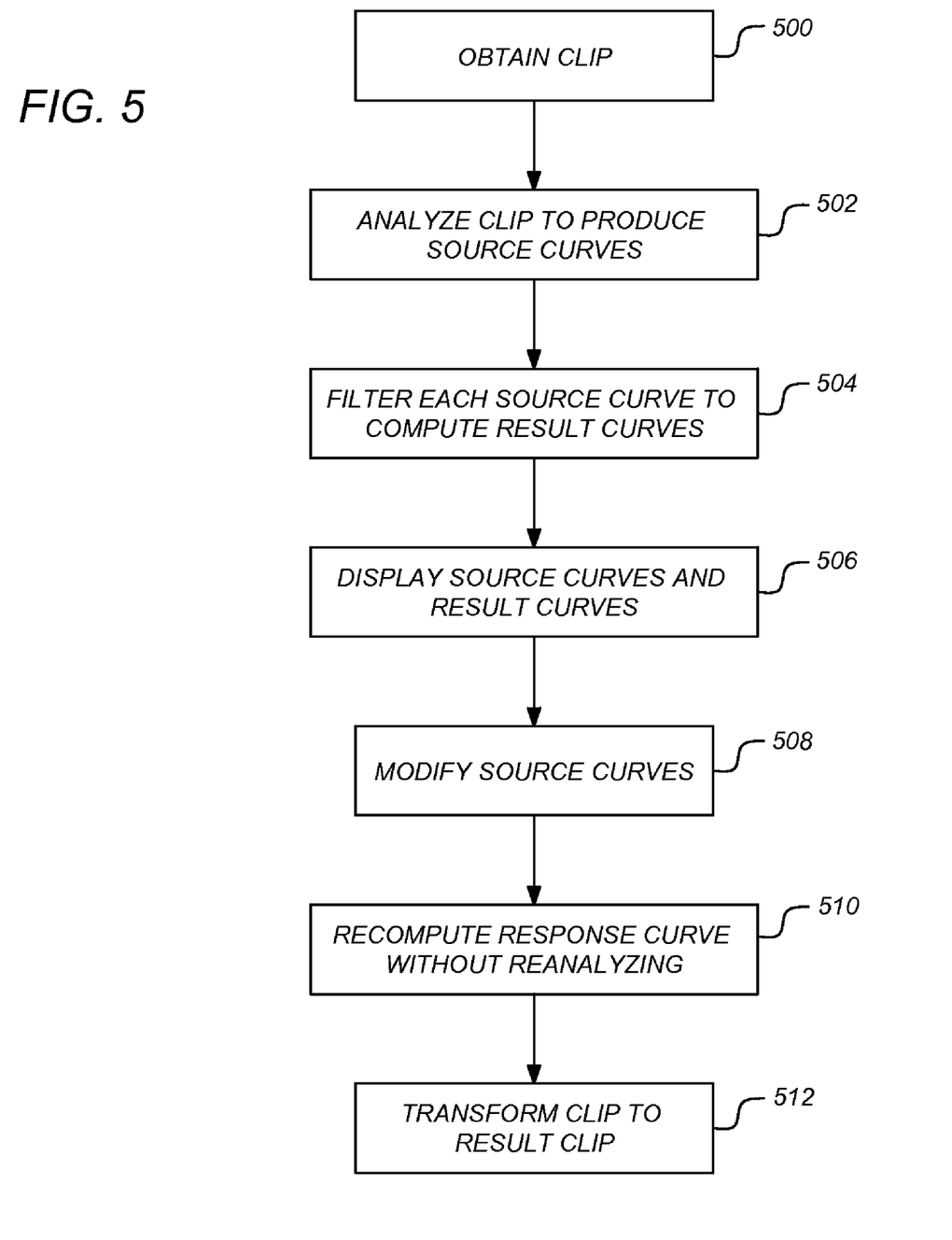
FIG. 5 is a flow chart illustrating the logical flow for stabilizing a series of two or more still images (i.e., a clip of image data) in accordance with one or more embodiments of the invention.

FIG. 5 is a flow chart illustrating the logical flow for stabilizing a series of two or more still images (i.e., a clip of image data) in accordance with one or more embodiments of the invention. At step 500, a series of two or more still images (i.e., an original shot or video clip 107) is obtained into a memory of a computer.

At step 502, the clip is analyzed (using a computer hardware processor) to produce a set of one or more source curves.

The source curves represent a global movement detected in the clip (e.g., camera shake, jitter, etc.). The source curves may consist of an x-position curve, a y-position curve, a x-scaling curve, a y-scaling curve, a z-rotation curve, a x-perspective curve, a y-perspective curve, a shear perspective curve (i.e., a perspective from a specific set of coordinates), and an anamorphic perspective curve (i.e., a curve that may require a user/view to use a special device or occupy a specific vantage point/perspective to reconstitute the image).

Various methods may be used to produce the source curves. In one or more embodiments, a series of steps are performed for each image in the clip. A first image being analyzed is compared to a second image from the clip (e.g., the next sequential image in the clip). A transformation matrix is produced, based on the comparing that represents a detected transformation between the two images being compared. Parameters from each transformation matrix are extracted. Source curves are then created, with each of the source curve corresponding to each of the parameters animated over time (i.e., across the clip). Standard matrix operations may be used to perform the extractions.

At step 504, each of the source curves is filtered (e.g., using a computer hardware processor) to compute one or more result curves into the memory of the computer. Such filtering may filter out/exclude high frequency data from the source curves. Further, the high frequency data may be filtered using a blur operation.

At step 506, the source curves and result curves are displayed on a display device. In other words, the curves themselves (that represent the different parameters) are directly exposed to the user.

At step 508, input is accepted from a user modifying/tweaking the source curves.

At step 510, the result curves are recomputed into the memory of the computer. Such a re-computation is performed automatically, without additional user input, and without re-analyzing the clip of image data (i.e., the original shot).

At step 512, the original shot/clip is transformed into a result clip/series based on the source curves and result curves. In this regard, based on the difference between the source and result curves, a transformation matrix can be created (i.e., using standard matrix operations) that is then applied to each frame in the clip. The result is a clip of image data that has been stabilized based on user interaction with the source curves. Since the original clip does not need to be reanalyzed to produce trackers, a significant decrease in both computing time and processor use is achieved.

Conclusion

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer-implemented method for stabilizing a series of two or more still images comprising:
   (a) obtaining the series of two or more still images into a memory of the computer;
   (b) analyzing, using a computer hardware processor, the series of two or more still images to produce a set of one or more source curves, wherein:
   (i) the one or more source curves represent a global movement detected in the series of two or more still images; and
   (ii) the set of one or more source curves are produced by performing the following steps for each image in the series of two or more images:
   (1) comparing a first image being analyzed to a second image from the series of two or more still images;
   (2) producing a transformation matrix based on the comparing, wherein the transformation matrix represents a detected transformation between the first image being analyzed and the second image;
   (3) extracting one or more parameters from each transformation matrix produced; and
   (4) creating one or more source curves, with each of the one or more source curves corresponding to each of the one or more parameters animated over time;
   (c) filtering, using the computer hardware processor, each of the one or more source curves to compute one or more result curves into the memory of the computer;
   (d) displaying the one or more source curves and one or more result curves on a display device;
   (e) accepting input from a user modifying the one or more source curves;
   (f) automatically, without additional user input, and without reanalyzing the series of two or more still images, recomputing the one or more result curves into the memory of the computer;
   (g) transforming the series of two or more still images, into a result series, based on the one or more source curves and one or more result curves.

2. The method of claim 1, wherein the one or more source curves comprise one or more position curves.

3. The method of claim 1, wherein the one or more source curves comprise one or more scaling curves.

4. The method of claim 1, wherein the one or more source curves comprise one or more rotation curves.

5. The method of claim 1, wherein the one or more source curves comprise one or more perspective curves.

6. The method of claim 1, wherein the filtering comprises filtering high frequency data from the one or more source curves.

7. The method of claim 6, wherein the filtering of high frequency data comprises performing a blur operation.

8. An apparatus for stabilizing a series of two or more still images in computer system comprising:
   (a) a computer having a memory;
   (b) a series of two or more still images;
   (c) a display device communicatively coupled to the computer;
   (d) an application executing on the computer, wherein the application is configured to:
   (i) obtain the series of two or more still images into the memory;
   (ii) analyze the series of two or more still images to produce a set of one or more source curves, wherein:
   (1) the one or more source curves represent a global movement detected in the series of two or more still images; and
   (2) the set of one or more source curves are produced by the application performing the following steps for each image in the series of two or more images:

(A) comparing a first image being analyzed to a second image from the series of two or more still images;

(B) producing a transformation matrix based on the comparing, wherein the transformation matrix represents a detected transformation between the first image being analyzed and the second image;

(C) extracting one or more parameters from each transformation matrix produced; and (D) creating one or more source curves, with each of the one or more source curves corresponding to each of the one or more parameters animated over time;

(iii) filter each of the one or more source curves to compute one or more result curves into the memory;

(iv) display the one or more source curves and one or more result curves on the display device;

(v) accept input from a user modifying the one or more source curves;

(vi) automatically, without additional user input, and without reanalyzing the series of two or more still images, recompute the one or more result curves into the memory;

(vii) transform the series of two or more still images, into a result series, based on the one or more source curves and one or more result curves.

9. The apparatus of claim 8, wherein the one or more source curves comprise one or more position curves.

10. The apparatus of claim 8, wherein the one or more source curves comprise one or more scaling curves.

11. The apparatus of claim 8, wherein the one or more source curves comprise one or more rotation curves.

12. The apparatus of claim 8, wherein the one or more source curves comprise one or more perspective curves.

13. The apparatus of claim 8, wherein the filtering comprises filtering high frequency data from the one or more source curves.

14. The apparatus of claim 13, wherein the filtering of high frequency data comprises performing a blur operation.

15. A non-transitory computer readable storage medium encoded with computer program instructions which when accessed by a computer cause the computer to load the program instructions to a memory therein creating a special purpose data structure causing the computer to operate as a specially programmed computer, executing a method of stabilizing a series of two or more still images, comprising:

(a) obtaining, in the specially programmed computer, the series of two or more still images into the memory;

(b) analyzing, in the specially programmed computer, the series of two or more still images to produce a set of one or more source curves, wherein:

(i) the one or more source curves represent a global movement detected in the series of two or more still images; and (ii) the set of one or more source curves are produced by performing the following steps, in the specially programmed computer, for each image in the series of two or more images:

(1) comparing a first image being analyzed to a second image from the series of two or more still images;

(2) producing a transformation matrix based on the comparing, wherein the transformation matrix represents a detected transformation between the first image being analyzed and the second image;

(3) extracting one or more parameters from each transformation matrix produced; and (4) creating one or more source curves, with each of the one or more source curves corresponding to each of the one or more parameters animated over time;

(c) filtering, in the specially programmed computer, each of the one or more source curves to compute one or more result curves;

(d) displaying, using the specially programmed computer, the one or more source curves and one or more result curves on a display device;

(e) accepting, in the specially programmed computer, input from a user modifying the one or more source curves;

(f) automatically recomputing, in the specially programmed computer, without additional user input, and without reanalyzing the series of two or more still images, the one or more result curves;

(g) transforming, in the specially programmed computer, the series of two or more still images, into a result series, based on the one or more source curves and one or more result curves.

16. The computer program storage medium of claim 15, wherein the one or more source curves comprise one or more position curves.

17. The computer program storage medium of claim 15, wherein the one or more source curves comprise one or more scaling curves.

18. The computer program storage medium of claim 15, wherein the one or more source curves comprise one or more rotation curves.

19. The computer program storage medium of claim 15, wherein the one or more source curves comprise one or more perspective curves.

20. The computer program storage medium of claim 15, wherein the filtering comprises filtering high frequency data from the one or more source curves.

21. The computer program storage medium of claim 20, wherein the filtering of high frequency data comprises performing a blur operation.

* * * * *